(12) United States Patent
Yu et al.

(10) Patent No.: US 8,165,588 B2
(45) Date of Patent: Apr. 24, 2012

(54) FRAME STRUCTURES, METHOD AND APPARATUS FOR RESOURCE ALLOCATION IN WIRELESS COMMUNICATIONS SYSTEM BASED ON FULL DUPLEX REPLAY

(75) Inventors: Tak-Ki Yu, Yongin-si (KR); Yung-Soo Kim, Seongnam-si (KR); Sang-Boh Yun, Seongnam-si (KR); Myeon-Kyun Cho, Seongnam-si (KR); Chan-Ho Min, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 225 days.

(21) Appl. No.: 12/313,569

(22) Filed: Nov. 21, 2008

(65) Prior Publication Data
US 2009/0147706 A1 Jun. 11, 2009

(30) Foreign Application Priority Data
Nov. 21, 2007 (KR) .................. 10-2007-0119439

(51) Int. Cl.
*H04Q 7/20* (2006.01)

(52) U.S. Cl. ....................... 455/442; 370/315

(58) Field of Classification Search .............. 370/400; 455/452.2
See application file for complete search history.

(56) References Cited

U.S. PATENT DOCUMENTS

| | | | |
|---|---|---|---|
| 2007/0217433 A1* | 9/2007 | Doppler et al. | 370/400 |
| 2008/0227461 A1* | 9/2008 | Dayal et al. | 455/452.2 |
| 2008/0300004 A1* | 12/2008 | Balachandran et al. | 455/522 |
| 2009/0003267 A1* | 1/2009 | Ramachandran et al. | 370/328 |

* cited by examiner

*Primary Examiner* — Seema S Rao
*Assistant Examiner* — Wanda Russell

(57) ABSTRACT

Frame structures, a method and an apparatus for resource allocation in a wireless communication system based on a full duplex relay are provided. The method for a centralized resource allocation in the wireless communication system based on the full duplex relay includes receiving channel information from a plurality of mobile stations (MSs) and relay stations (RSs); scheduling radio resources for a link between a base station (BS) and the MS and a link between the BS and the RS using the channel quality; constituting a first radio resource region for the link between the BS and the RS and a second radio resource region for the link between the BS and the MS; and scheduling radio resource for a link between the RS and the MS by reusing the first radio resource region. The relay link resource is reused in the full-duplex relay structure, and the system capacity can be raised by minimizing the interference in the resource utilization.

24 Claims, 11 Drawing Sheets

(A) BS FRAME (B) RS ANTENNA 1 RECEIVE FRAME (C) RS ANTENNA 2 TRANSMIT FRAME

FRAME STRUCTURES, METHOD AND APPARATUS FOR RESOURCE ALLOCATION IN WIRELESS COMMUNICATIONS SYSTEM BASED ON FULL DUPLEX REPLAY

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Nov. 21, 2007 and assigned Serial No. 10-2007-0119439, the entire disclosure of which is hereby incorporated by reference.

TECHNICAL FIELD OF THE INVENTION

The present invention relates generally to a relay station in a wireless communication system. More particularly, the present invention relates to frame structures, a method and an apparatus for allocating resources in a wireless communication system based on a full duplex relay.

BACKGROUND OF THE INVENTION

When a network is configured in an initial cell design of a cellular wireless communication system, coverage holes are generated due to surroundings or regional features such as buildings. The coverage hole is an area within a radio coverage of a wireless system, in which a radio frequency (RF) signal level is below a preset threshold. The coverage hole is usually caused by physical obstructions such as buildings, trees, tunnels, and indoor parking garages.

To address the coverage hole, current cellular wireless communication systems by installing repeaters. Disadvantageously, repeaters cause performance degradation in noise amplification. In response to this, a relay system is suggested to decode and forward a signal from a base station (BS), beyond mere signal amplification. Research is conducted on the relay system for the sake of throughput enhancement and coverage extension of the cellular wireless communication system. The Institute of Electrical and Electronics Engineers (IEEE) 802.16j is standardizing the relay system for its practical use. Using a relay station (RS), deployment and maintenance costs can be reduced, and the performance can be improved compared to a conventional single-hop system.

However, the current RS operates based on a half duplex scheme. Communications using the half-duplex RS utilize radio resources between the BS and the RS and radio resources between the RS and a terminal. In this case, the increased resource consumption is quite inefficient compared to the single-hop system (the system without RSs).

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide a method, an apparatus, and frame structures for resource allocation in a wireless communication system based on a full-duplex relay station (RS) to thus address inefficient resource utilization of a half-duplex RS.

The above aspects are achieved by providing a method for a centralized resource allocation in a wireless communication system based on a full-duplex relay. The method includes receiving channel information from a plurality of mobile stations (MSs) and RSs; scheduling radio resources for a link between a base station (BS) and the MS and a link between the BS and the RS using the channel quality; constituting a first radio resource region for the link between the BS and the RS and a second radio resource region for the link between the BS and the MS; and scheduling radio resources for a link between the RS and the MS by reusing the first radio resource region.

According to one aspect of the present invention, a method of operating a BS for a distributed resource allocation in a wireless communication system based on a full-duplex relay, includes receiving channel information from a plurality of MSs; determining radio resource amounts to be allocated for a link between the BS and the MS and a link between the BS and an RS using the channel information received from the MSs; and allocating radio resource for the link between the BS and the RS in a corresponding region of a frame according to the determined resource amount.

According to another aspect of the present invention, a method of operating an RS for a distributed resource allocation in a wireless communication system based on a full-duplex relay, includes receiving channel information from a plurality of MSs; and allocating radio resources between the RS and the MS in a preset resource region using the channel information.

According to yet another aspect of the present invention, an apparatus for a distributed resource allocation in a wireless communication system based on a full-duplex relay includes a feedback part for receiving channel information from a plurality of MSs and RSs; a scheduler for scheduling radio resources for a link between a BS and the MS and a link between the BS and the RS using the channel quality, and scheduling radio resources for a link between the RS and the MS by reusing the radio resources for the link between the BS and the RS; and a resource region constitutor for constituting a first radio resource region for the link between the BS and the RS and a second radio resource region for the link between the BS and the MS.

According to still another aspect of the present invention, an apparatus of a BS for a distributed resource allocation in a wireless communication system based on a full-duplex relay includes a feedback part for receiving channel information from a plurality of MSs; a controller for determining radio resource amounts to be allocated for a link between the BS and the MS and a link between the BS and an RS using the channel information received from the MSs; and a scheduler for allocating radio resource for the link between the BS and the RS in a corresponding region of a frame according to the determined resource amount.

According to further aspect of the present invention, an apparatus of an RS for a distributed resource allocation in a wireless communication system based on a full-duplex relay includes a receive modem for receiving channel information from a plurality of MSs; and a data buffer for allocating radio resources between the RS and the MS in a preset resource region using the channel information.

According to further aspect of the present invention, a frame structure, for resource allocation in a wireless communication system based on a full-duplex relay, is transmitted and received to and from a BS over a first antenna and to and from a MS and a lower RS over a second antenna.

According to further aspect of the present invention, a frame structure, for resource allocation in a wireless communication system based on a full-duplex relay, is received over a first antenna and transmitted over a second antenna, or transmitted over the first antenna and received over the second antenna.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a frame structure, a method and an apparatus for allocating resources in a wireless communication system based on a full-duplex relay scheme.

Figure 1:
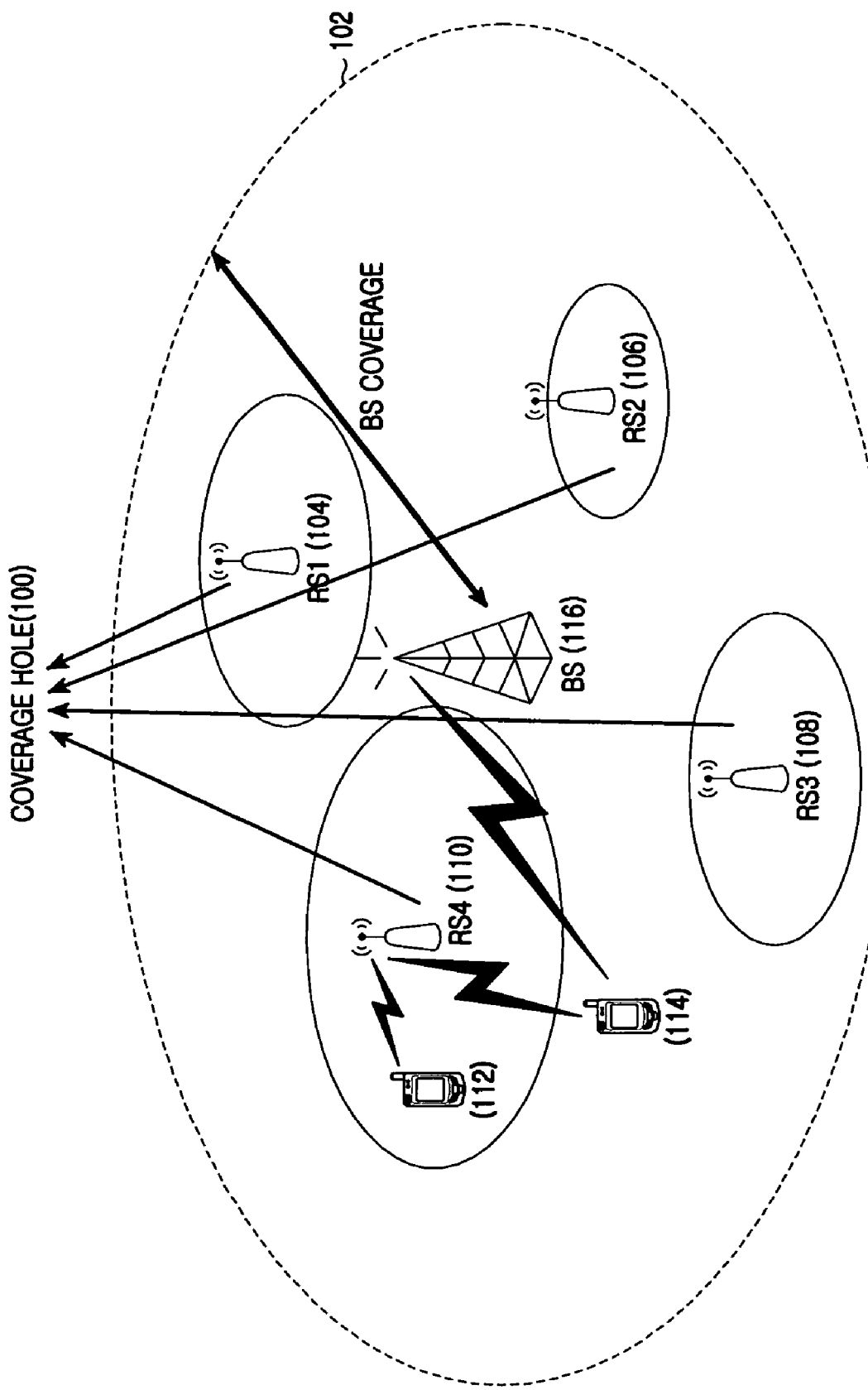
FIG. 1 illustrates a relay system for addressing coverage holes according to an exemplary embodiment of the present invention.

FIG. 1 illustrates a relay system for addressing coverage holes according to an exemplary embodiment of the present invention.

The present invention gives careful consideration to a case where a plurality of coverage holes 100 is generated in a single cell 102 because of geographical or environmental features. While the conventional cellular wireless communication system clears the coverage holes 100 using a repeater, the noise is amplified. The noise amplification can be removed by installing a relay station (RS). When RSs 104, 106, 108 and 110 are installed against the coverage holes 100, a base station (BS) 116 and the RSs 104 through 110 interfere with each other when reusing resources. The reuse of the resources in relation to interference is quite important in terms of the performance maximization of the relay system.

When communicating via the RS using a half-duplex scheme, radio resources between the BS 116 and the RSs 104 through 110 and radio resources between the RSs 104 through 110 and terminals 112 and 114 are allocated and used. In this situation, increase in resource consumption is inevitable compared to the single-hop system (the system without RSs). When the terminal 112 in the coverage hole communicates with the BS 116 via the RS4 110 and the terminal 114 directly communicates with the BS 116, the terminal 112 requires the radio resource between the terminal 112 and the RS4 110 and the radio resource between the RS4 110 and the BS 116, and the terminal 114 requires only the radio resource between the terminal 114 and the BS 116. Naturally, the terminal 112 communicates with the BS 116 using more radio resources than the terminal 114. This is because the terminal 112 cannot simultaneously process the communications with the RS4 110 and the communications between the RS4 110 and the BS 116 in the half duplex communications.

A full-duplex relay system, which is a recently suggested approach, is not yet fully developed. The full-duplex relay system of the present invention lets the relay link (RS→BS or RS→MS) resource and the access link (MS→BS or MS→RS) resource share downlink resources. Herein, when the resource allocation is carried out using interference caused by sharing the relay link resource and the access link resource, the performance of the full-duplex relay system can be maximized. The present invention provides a method and an apparatus for effectively allocating the resources using the interference of the full-duplex relay system. Relevant frame structures of the present invention are now described in reference to FIGS. 2 through 11.

Figure 2:
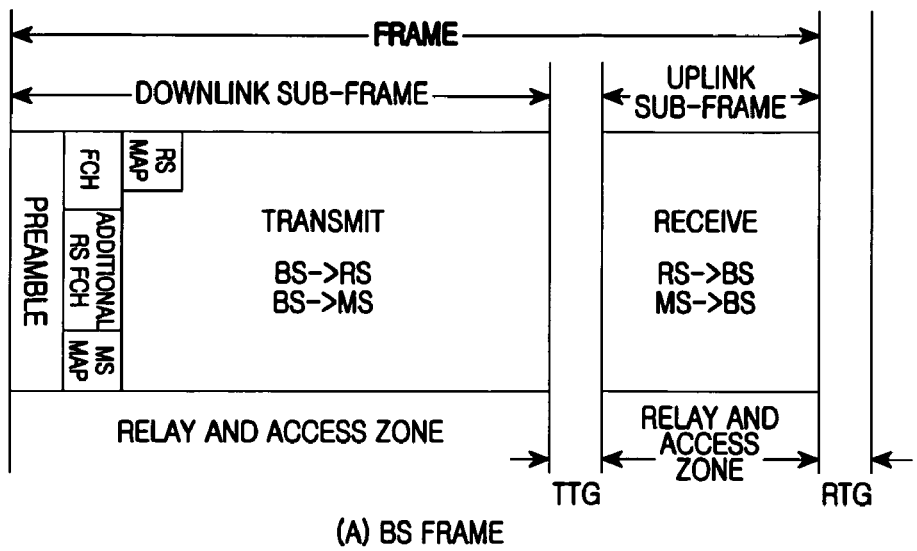
FIG. 2 illustrates first frame structures for full-duplex relay according to an exemplary embodiment of the present invention.
Figure 2:
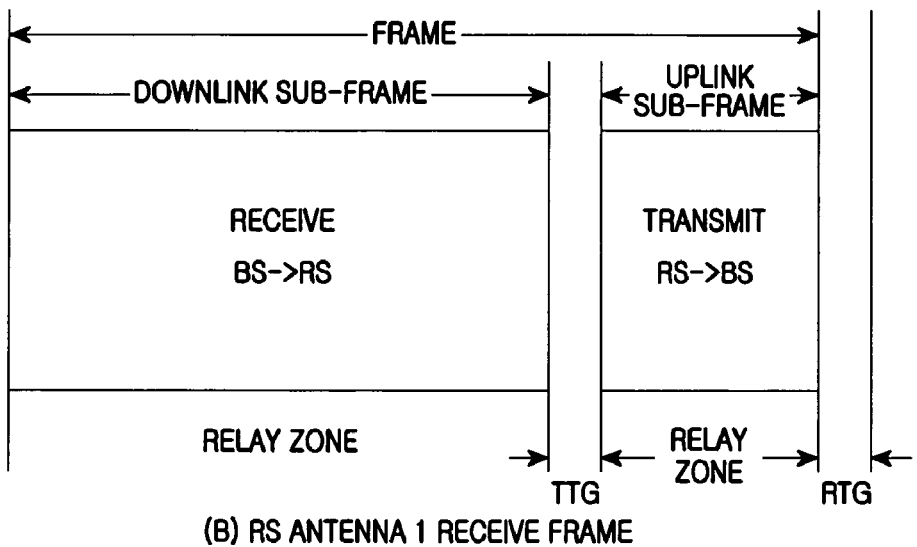
Figure 2:
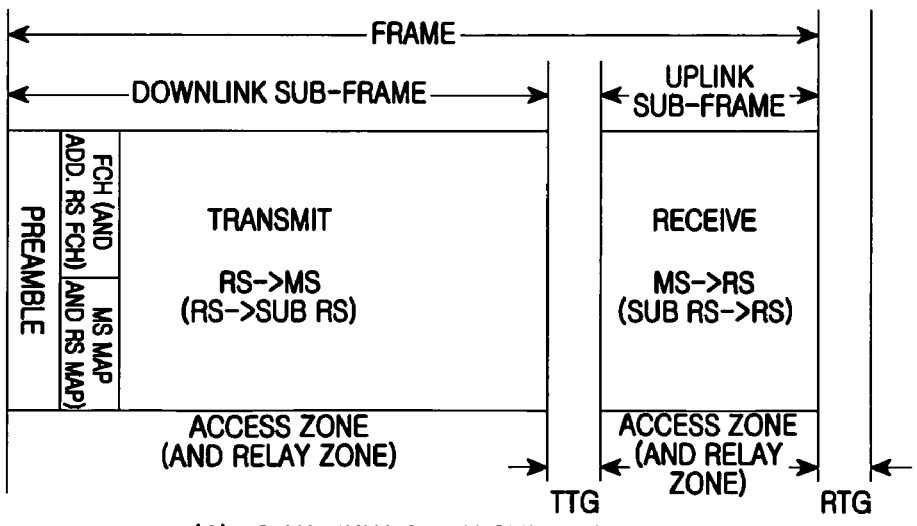

FIG. 2 illustrates frame structures for the full-duplex relay according to an exemplary embodiment of the present invention.

The uplink and the downlink of a Time Division Duplex (TDD) system are separated based on a transmission time. The downlink transmission starts with one preamble symbol, a Frame Control Header (FCH), an additional RS FCH, Mobile Station (MS) MAP/RS MAP, and data symbols in that order. The uplink transmission starts with a control symbol. Transmit/receive Transition Gap (TTG) and Receive/transmit Transition Gap (RTG), which are guard times to distinguish the UpLink (UL) transmission time and the DownLink (DL) transmission time, are inserted in between the frames and between the DL and the UL. The DL frame includes the preamble, the FCH, the MAP bursts, and the traffic bursts, whereas the UL frame includes the control channel interval and the traffic bursts. The preamble is used for the network synchronization and the cell search, and the FCH carries frame constitution information. The FCH field is defined according to a Media Access Control (MAC) standard. The MS MAP includes Information Elements (IEs) and constitution information of bursts carried in the downlink or the uplink. The RS MAP includes IEs and constitution information of bursts carried in the relay link.

FIG. 2A depicts a BS frame, and FIGS. 2B and 2C depict RS frames. Particularly, the frame of FIG. 2B is transmitted and received over an RS antenna 1, and the frame of FIG. 2C is transmitted and received over an RS antenna 2. The transmission and the reception of the antenna 1 and the antenna 2 are performed at the same time.

The antenna 1 is used only for the communications with the BS, and the antenna 2 is used only for the communications with the MS and the sub-RS. Both the transmission and the reception are performed at each antenna, which corresponds to a dual-mode structure. For example, the BS sends data in the direction of BS→RS and/or BS→MS using the DL frame, and receives data in the direction of RS→BS and/or MS→BS in the uplink. The antenna 1 of the RS receives the data from the BS using the DL frame and sends data to the BS in the uplink. Concurrently, the antenna 2 of the RS sends data to the MS in the downlink and receives data from the MS in the uplink.

Figure 3:
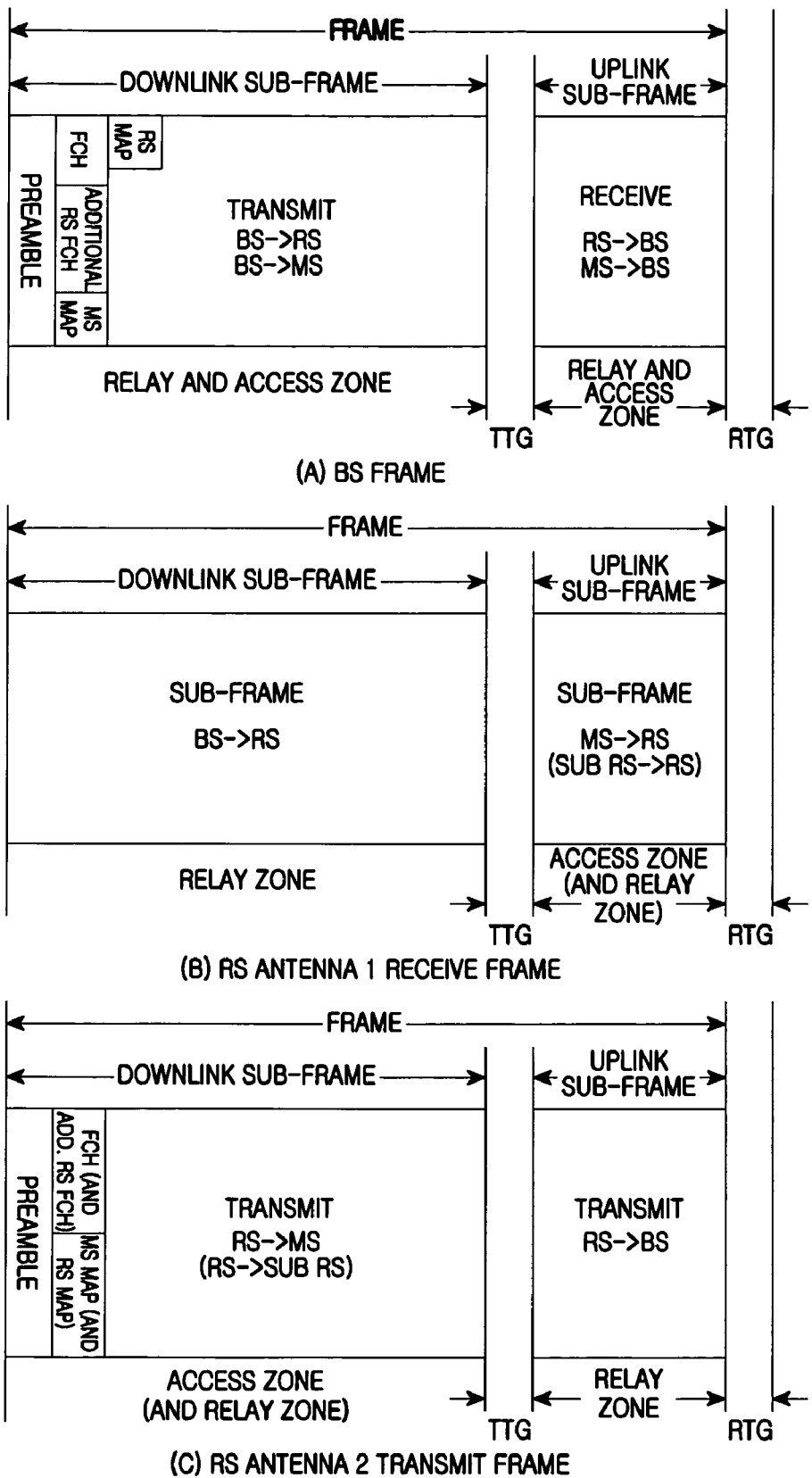
FIG. 3 illustrates second frame structures for the full-duplex relay according to an exemplary embodiment of the present invention.

FIG. 3 illustrates frame structures for the full-duplex relay according to another exemplary embodiment of the present invention.

FIG. 3A depicts a BS frame, and FIGS. 3B and 3C depict RS frames. Particularly, the frame of FIG. 3B is merely received over an RS antenna 1, and the frame of FIG. 3C is merely transmitted over an RS antenna 2. The transmission and the reception of the antenna 1 and the antenna 2 are performed at the same time (the single mode structure).

As mentioned in FIGS. 2 and 3, the RS employs the two antennas (the antenna 1 and the antenna 2), and the relay link and the access link share the downlink resource and the uplink resource. Thus, the relay link and the access link are not separated from each other but coexist in the frame as shown in FIG. 2B, 2C or 3B, and 3C. In other words, the RS can receive data in the access link and transmit data in the relay link at the same time, or transmit data in the access link and receive data in the relay link at the same time.

Though the single-mode structure of FIG. 3 might be advantageous in terms of the hardware, the dual-mode structure of FIG. 2 is more appropriate to maximize the performance gain of the RS. Namely, the channel quality of the relay link and the access link can be raised by installing the antenna 1 at a location suitable for the communications with the BS and the antenna 2 at a location suitable for the communications with the MS. Hereafter, descriptions assume the dual-mode frame structure of FIG. 2.

The present invention considers a case where the isolation between the RSs is sufficient and every RS reuses the entire radio resource, and a case where interference information between the RSs is known in advance and the scheduling is performed based on the RS interference.

Figure 4:
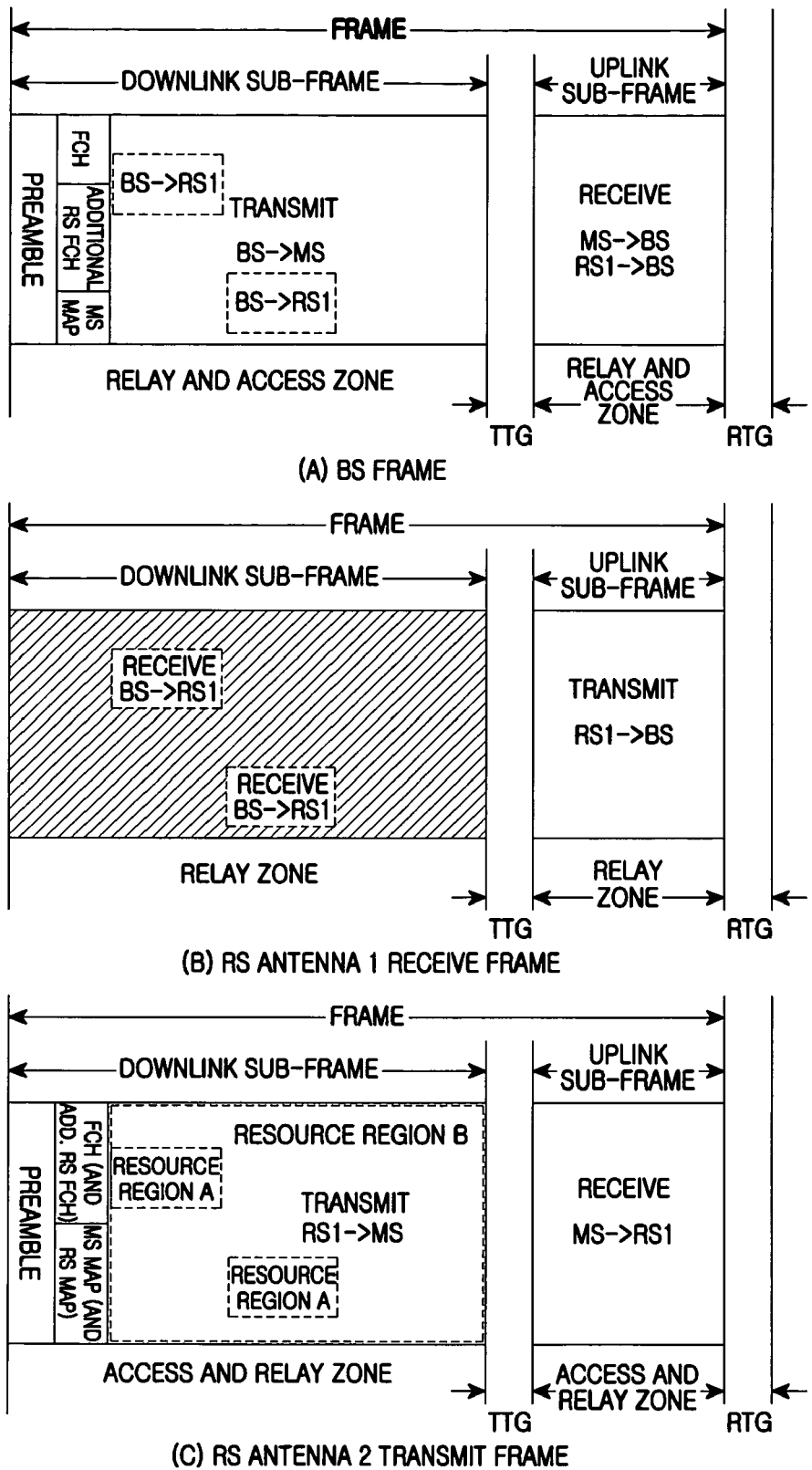
FIG. 4 illustrates frame structures of a full-duplex relay system when resource permutation patterns of a base station (BS) and a relay station (RS) are the same.

FIG. 4 illustrates frame structures of the full-duplex relay system when the resource permutation patterns of the BS and the RS are the same.

The BS allocates BS→RS resource and BS→MS resource as shown in FIG. 4A. When the resource permutation patterns of the BS and the RS are the same, the BS→RS link resource is scheduled in the distributed manner, the resource region A becomes the set of the distributed resources, and the other regions constitute the resource region B for the BS→MS link resource. FIG. 4B depicts the frame structure in view of the RS antenna 1, and FIG. 4C depicts the frame structure in view of the RS antenna 2. The frame structures of FIGS. 4B and 4C use the same spectrum resource and are transmitted and received at the same time.

Figure 5:
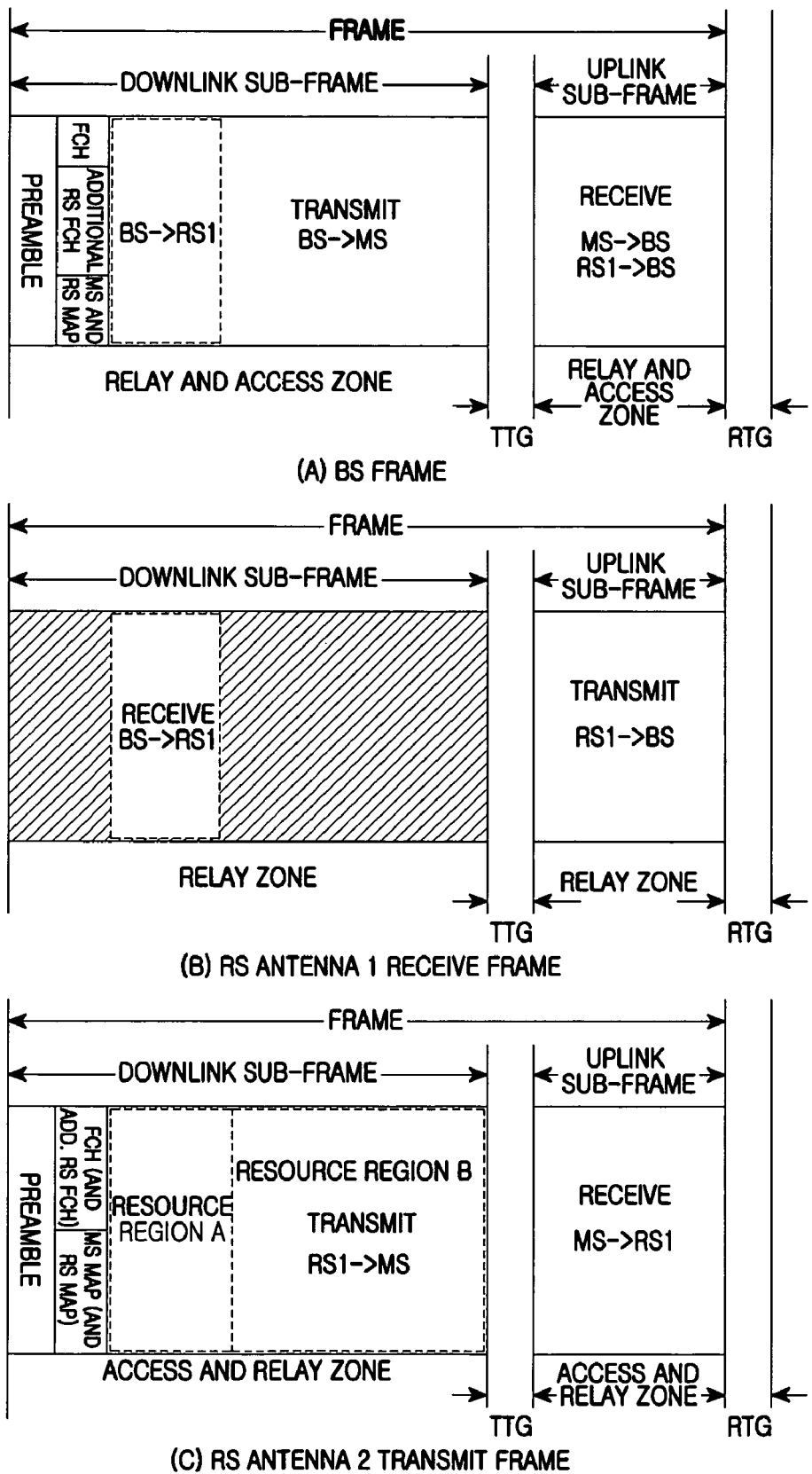
FIG. 5 illustrates frame structures of the full-duplex relay system when the resource permutation patterns of the BS and the RS are different from one another.

FIG. 5 illustrates frame structures of the full-duplex relay system when the resource permutation patterns of the BS and the RS are different from each other.

In FIG. 5, the resource permutation patterns of the BS and the RS are different from each other, and the BS→RS resource is collected and scheduled on the time basis. Although the time interval of the BS→RS resource lies at the head of the frame in FIG. 5A, the time interval of the BS→RS resource is randomly determined within the frame. The time interval length of the BS→RS resource is variable according to the required data amounts of the BS→RS link and the BS→MS link and the channel quality.

Figure 6:
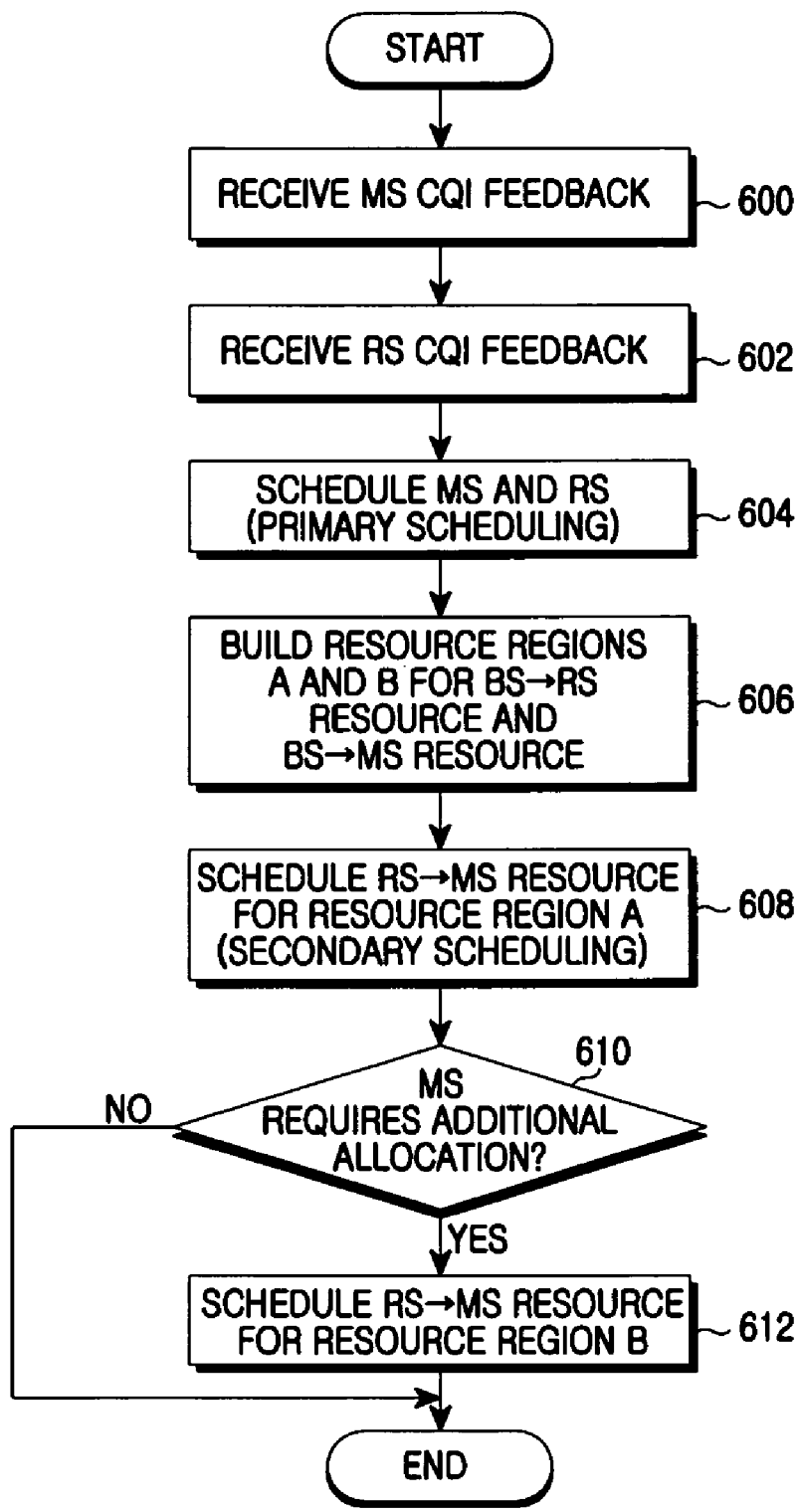
FIG. 6 illustrates a method for scheduling radio resources in a centralized manner in the full-duplex relay system according to an exemplary embodiment of the present invention.

FIG. 6 is a flowchart outlining a method for scheduling radio resources in the centralized manner in the full-duplex relay system according to an exemplary embodiment of the present invention.

In step 600, the BS receives Channel Quality Indicator (CQI) information fed back from the MS. Every MS measures its received signal strength using a preamble and a pilot signal received from its serving BS and generates CQI information. The generated CQI information is fed back to the serving BS using various methods such as Best-M and Discrete Cosine Transform (DCT). In various implementations, the CQI information of the MS can be generated using an uplink sounding method in the TDD based system, rather than the CQI feedback.

In step 602, the BS receives CQI information fed back from the RS. Herein, the CQI information of MSs belonging to the RS is fed back to the BS to be used in the scheduling of the BS.

In step 604, the BS schedules the MS and the RS (hereinafter, referred to as a primary scheduling). The CQI information of the MSs gathered at the BS are used in the access link scheduling. A set of RSs capable of reusing the resource is referred to as an RS reuse set. It is assumed that the BS knows information of a various number of RS reuse sets in advance. The RS reuse set can be made up in various manners using a dynamic allocation method based on the interference measurement between RSs or a fixed allocation method based on a distance between RSs. In the scheduling which reuses the entire resources without the interference based scheduling, the RS reuse set is a set of all of RSs.

In step 606, the BS constitutes a resource region A for the BS→RS resource and a resource region B for the BS→MS resource (see FIGS. 4 and 5).

In step 608, the BS schedules the RS→MS resource (hereafter, referred to as a secondary scheduling) with respect to the resource region A (the resource pre-allocated to BS→RS).

When there remains an MS requiring additional resource allocation in step 610, the BS schedules the RS→MS resource with respect to the resource region B in step 612. When there is no MS requiring additional resource allocation in step 610, the BS finishes this process.

Next, the BS finishes the resource allocation.

As such, the interference is minimized by first allocating the BS→RS relay link resource as the RS→MS access link resource in the access link resource scheduling for the BS and the RS reuse set. For example, in FIG. 1, the BS 116 allocates resources to BS→RS1 through RS4 and BS→MS 114 and reuses the allocated BS→RS4 resource for the RS4→MS 112 resource. Likewise, the resources for the RS1 through RS3→MS reuse the allocated BS→RS1 through RS3 resources.

When the BS→RS resource and the RS→MS resource are allocated alike, the interference caused by the RS can be minimized because the BS→RS resource is allocated not to overlap with the BS→MS resource, and the receive antenna of the RS can reject the interference of the transmit antenna of the RS in relation with the reused RS→MS resource. This interference minimizing method using the resource scheduling can vary the scheduling method and the frame constitution method depending on whether the resource permutation patterns or the resource hopping patterns of the BS and the RS are the same or not.

When the resource permutation (or hopping) patterns of the BS and the RS are the same, the DL resource scheduling for the BS and the RS reuse set starts with the scheduling of the BS (the primary scheduling in step 604). As for the full-duplex RS, as the BS simultaneously performs the communications with the RS and the communications with the MS, the scheduling is conducted by treating the RS like an MS. The scheduling method can adopt a maximum Signal to Interference and Noise Ratio (SINR) based scheduling method, a proportional fairness scheduling method, a round robin scheduling method, and so forth. Depending on the information of MSs belonging to the RS, the modified scheduling metric can be used. Next, upon completing the resource scheduling on the BS→RS link and the BS→MS link, the BS builds a scheduling region A with the resource pre-allocated to BS→RS and builds a scheduling region B with the resource pre-allocated to BS→MS (step 606). The scheduling on RS→MS is performed for the scheduling region A (the secondary scheduling in step 608). The relevant frame structures are shown in FIG. 4. When the resource allocation to every MS of the RS is finished during the scheduling on the resource region A, the scheduling is done. When there still remain MSs to allocate after the resource allocation on the resource region A is completed, the resource is allocated by additionally scheduling on the other resource region B. Therefore, it is possible to minimize the interference caused by the RS onto the MSs that directly communicate with the BS.

When the resource permutation (or hopping) patterns of the BS and the RS are different from each other, different resources can be allocated according to the permutation rule even in the same resource allocation of the scheduling. Hence, the interference result based on the resource arrangement as mentioned above is not acquired. To avoid this, the scheduling is performed such that the BS→RS resource is present only in a certain interval of the frame structure (see FIG. 5). That is, the BS→RS resource interval and the BS→MS resource interval are separated based on the time in the DL frame structure. The size of the separated time interval depends on the amount of data required by the RSs and the MSs and their channel status. The relevant frame structures are shown in FIG. 4. As aforementioned, the scheduling includes the primary scheduling and the secondary scheduling. First, the BS schedules the RS in the BS→RS resource interval and schedules the MS in the BS→MS interval (the primary scheduling). Upon completing the downlink scheduling, the BS schedules the RS→MS resource (the secondary scheduling). In doing so, the resource region A and the resource region B are individually constituted.

In the distributed scheduling, the BS and the RS independently schedule their corresponding MSs, rather than the BS scheduling every MS. Unlike the centralized scheduling, the RS does not need to feed the CQI information of the MS back to the BS. Herein, the downlink resources are independently scheduled in the distributed scheduling. To allocate the resources in consideration of the interference between the RSs, the BS predetermines a resource region of the independent scheduling. Each RS schedules based on the scheduling region information of each RS reuse set. The relevant frame structure is explained in FIG. 8.

Figure 7:
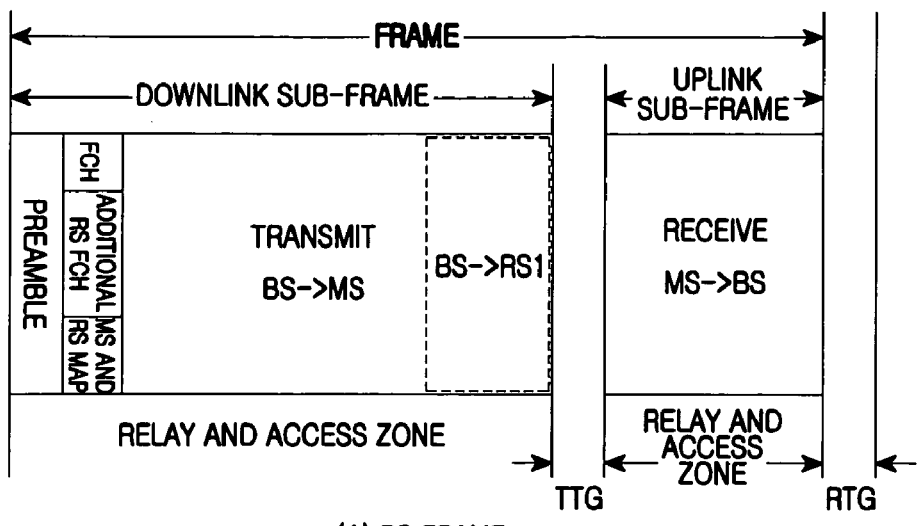
FIG. 7 illustrates frame structures of the full-duplex relay system in the distributed resource allocation according to an exemplary embodiment of the present invention.
Figure 7:
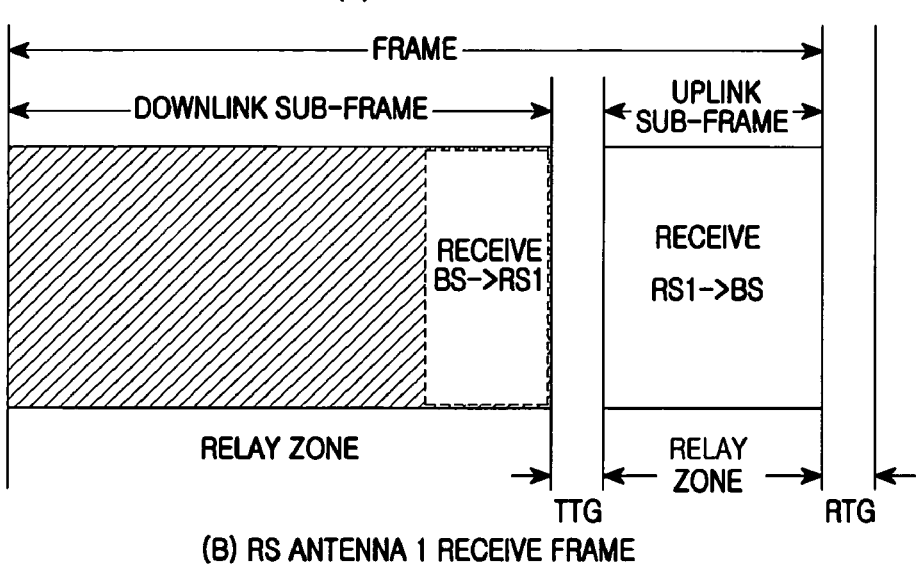
Figure 7:
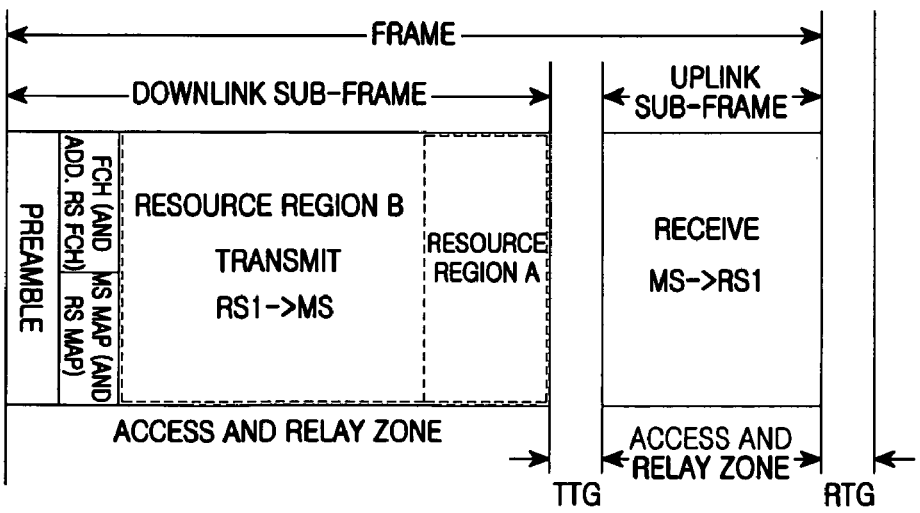

FIG. 7 illustrates frame structures of the full-duplex relay system in the distributed resource allocation according to an exemplary embodiment of the present invention.

The BS frame of FIG. 7A is constituted by allocating the BS→RS resource from the rear part in the DL frame. This frame structure is similar to the centralized frame structure of FIG. 5 in that the BS→RS link resource is scheduled in the certain limited time interval. Distinctively, the certain time interval of FIG. 5 can lie at a random location, whereas it is agreed that the certain time interval always stands at the back of the frame in the distributed resource allocation as shown in FIG. 7B.

In comparison with the duplex relay system, the frame structure features of the full-duplex relay system are summarized as below.

First, it is a single frame structure in which the relay link and the access link coexist. Secondly, it requires no preamble for the RS in the BS frame. Thirdly, it simultaneously transmits the frame related information and the broadcast information (FCH) for the MS and the RS within the BS frame. Fourthly, the MAP information for the MS and the RS are transmitted in succession in the BS frame. Fifthly, the upper station and the lower station share the resources.

Figure 8:
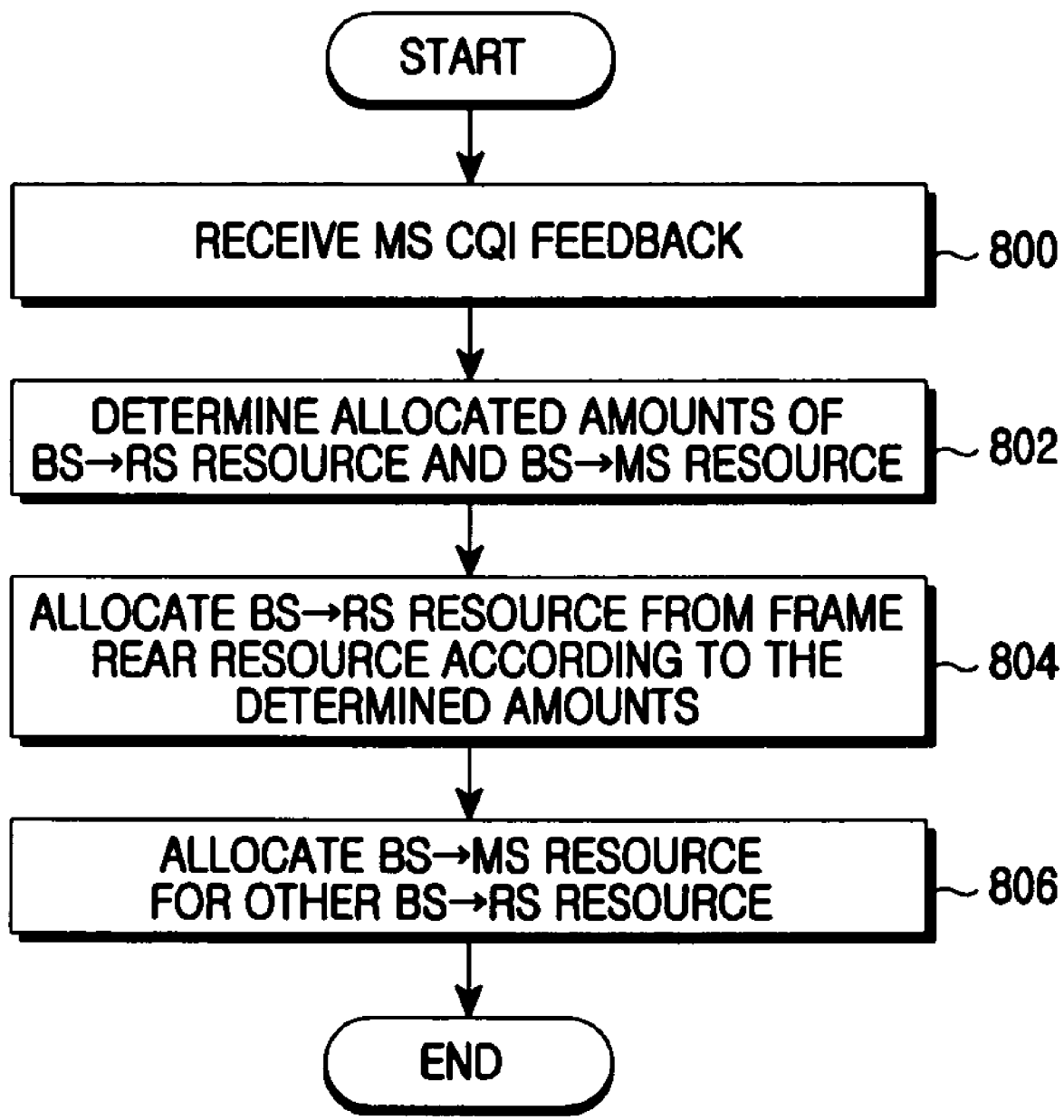
FIG. 8 illustrates a method of the BS scheduling radio resources in a distributed manner in the full-duplex relay system according to an exemplary embodiment of the present invention.

FIG. 8 is a flowchart outlining a method of the BS for scheduling radio resources in the distributed manner in the full-duplex relay system according to an exemplary embodiment of the present invention.

In step 800, the BS receives CQI information fed back from the MS. Herein, every MS measures its receive signal strength using the preamble and the pilot signal received from the BS, generates CQI information, and feeds the generated CQI information back. The BS constitutes CQI information of its MSs.

In step 802, the BS determines allocated amounts of the BS→RS link resource and the BS→MS link resource.

Next, the BS allocates the BS→RS resource according to the determined amount in step 804 and allocates the BS→MS resource according to the determined amount in step 806. In the distributed access link resource scheduling for the BS and the RS reuse set, the BS→RS link resource is first allocated as the RS→MS link resource to thus minimize the interference. Because the BS and the RS independently conduct the scheduling, it is impossible for the RS to allocate the resource by acquiring the resource allocation information of the BS in real time. Hence, regardless of the same or different resource permutation patterns of the BS and the RS, the BS→RS link resource region is predetermined. To reduce a signaling overhead on this resource region, a certain interval of the time zone is used as the BS→RS link resource.

The rear part of the frame is first allocated as the BS→RS link resource (see FIG. 6). In various implementations, the front part of the frame can be allocated as the BS→RS link resource. Instead, the rear part of the frame is first allocated as the BS→RS link resource because the size of the control data (FCH and MAP) resource region differs depending on the BS and the RS in the front part of the frame and the start point of the BS→RS link resource varies as well.

The downlink resource scheduling of the BS allocates the resources first with the front rear part through the RS based scheduling and allocates the resources in the other resource regions through the MS based scheduling. The individual RSs schedule their MSs in the allowed scheduling time (the entire time interval when reusing the entire resource). In so doing, given the considerable BS→MS resource requirement, the resource can be reused by additionally allocating the BS→MS resource.

Next, the BS finishes the resource allocation process.

Figure 9:
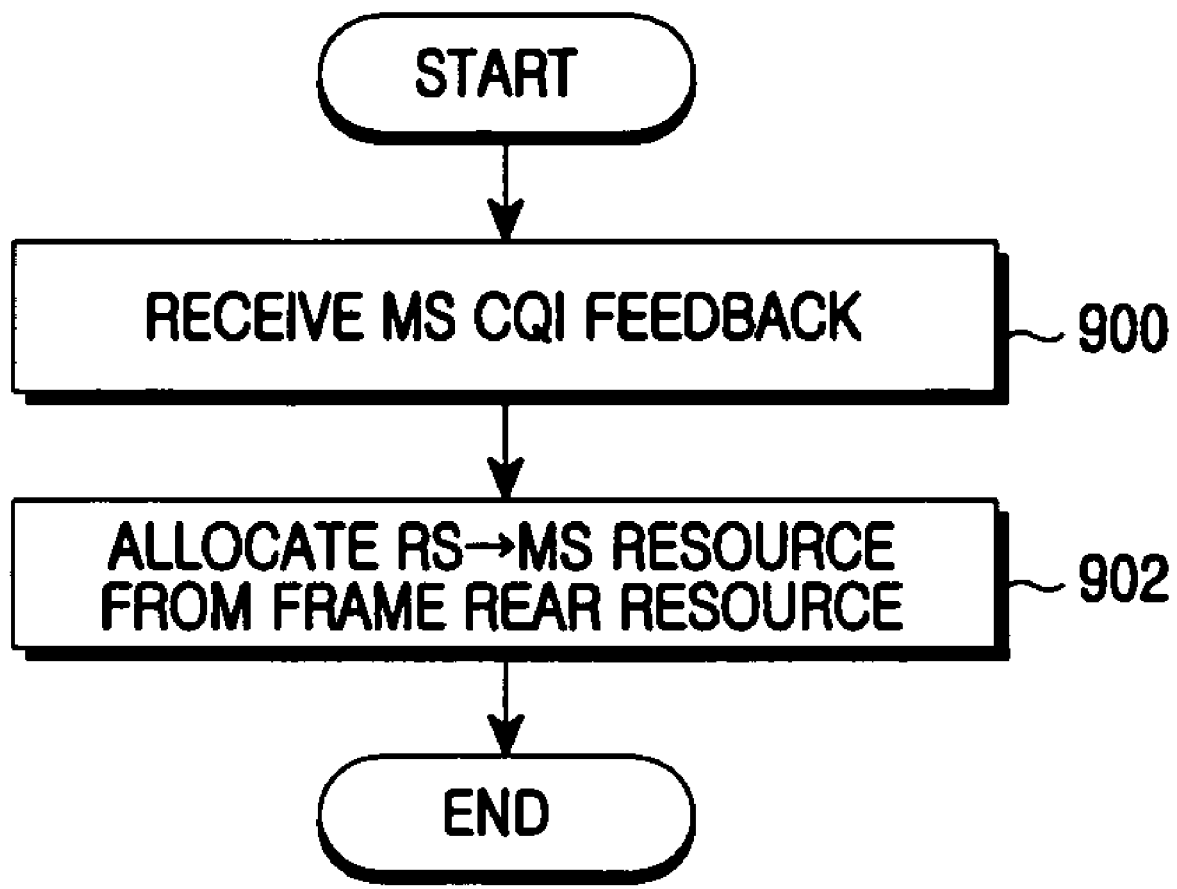
FIG. 9 illustrates a method of the RS scheduling radio resources in a distributed manner in the full-duplex relay system according to an exemplary embodiment of the present invention.

FIG. 9 is a flowchart outlining a method of the RS for scheduling radio resources in the distributed manner in the full-duplex relay system according to an exemplary embodiment of the present invention.

In step 900, the RS receives CQI information fed back from the MS. Herein, every MS measures its receive signal strength using the preamble and the pilot signal received from the RS, generates CQI information, and feeds the generated CQI information back. The RS constitutes CQI information of its MSs.

In step 902, the RS allocates resources first with the frame rear part as the RS→MS resource.

Next, the RS finishes the resource allocation process.

Figure 10:
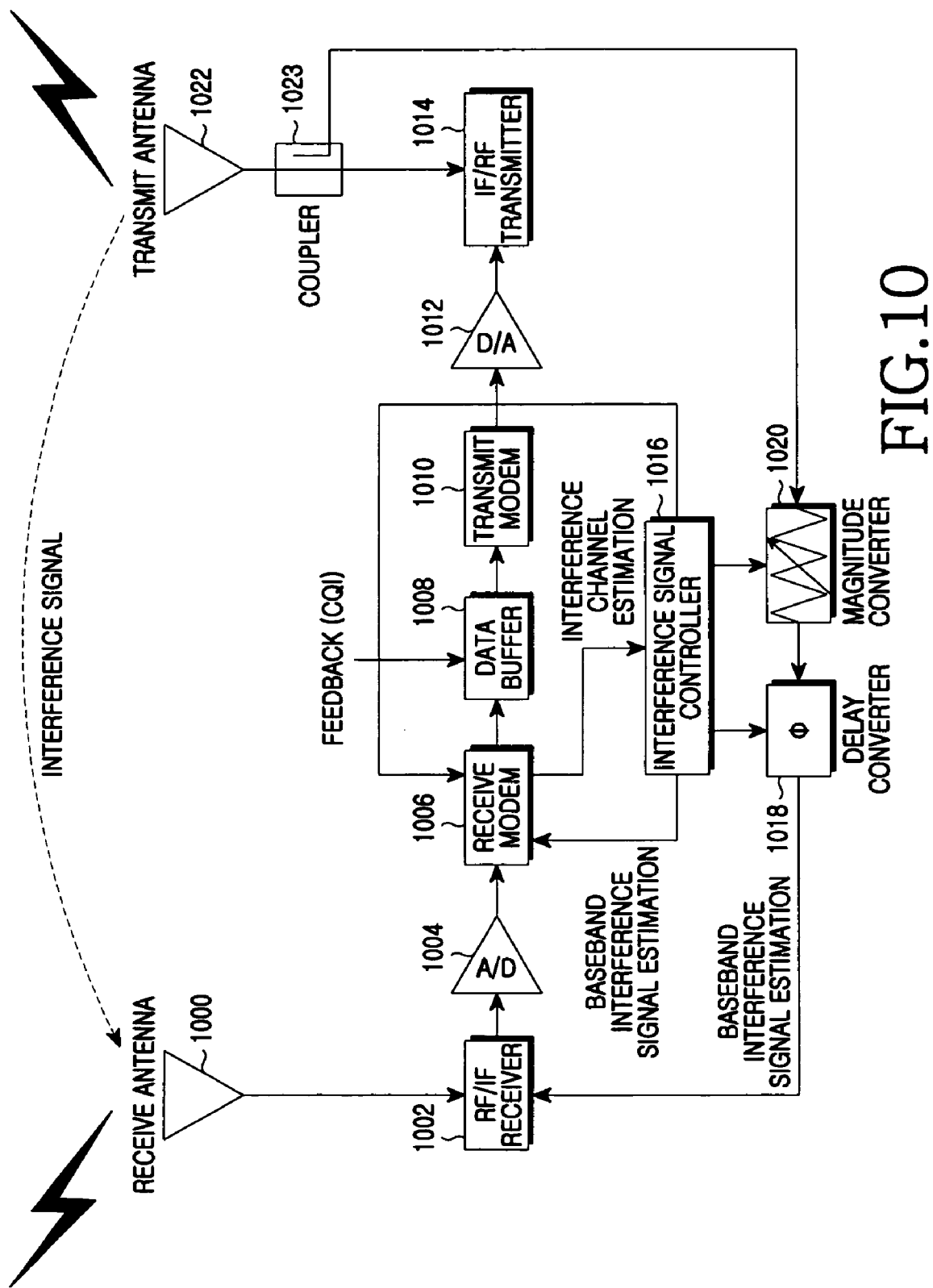
FIG. 10 illustrates the RS apparatus according to an exemplary embodiment of the present invention.

FIG. 10 is a block diagram of the RS apparatus according to an exemplary embodiment of the present invention.

The RS of FIG. 10 includes a radio frequency (RF)/intermediate frequency (IF) receiver 1002, an analog/digital (A/D) converter 1004, a receive modem 1006, a data buffer 1008, a transmit modem 1010, a digital/analog (D/A) converter 1012, an IF/RF transmitter 1014, an interference signal controller 1016, a delay converter 1018, and a magnitude converter 1020.

The RF/IF receiver 1002 detects and receives an RF signal over a receive antenna 1000 and outputs the RF signal to the A/D converter 1004. Herein, the RF/IF receiver 1002 receives an RF signal transmitted over a transmit antenna 1022 from the delay converter 1018 and removes the RF signal from the receive signal. This is because the RF signal output via the transmit antenna 1022 is received at the receive antenna 1000 and causes the interference.

The A/D converter 1004 converts the receive signal output from the RF/IF receiver 1002 to a digital signal and outputs the digital signal to the receive modem 1006. The receive modem 1006 processes the digital signal output from the A/D converter 1004 according to the communication protocol and outputs the processed signal to the data buffer 1008.

The data buffer 1008 allocates the RS ↔ MS resource from the predetermined resource region using the CQI information of the digital signal output from the receive modem 1006.

The transmit modem 1010 processes the data output from the data buffer 1008 according to the communication protocol and outputs the processed data to the D/A converter 1012. The D/A converter 1012 converts the digital signal processed at the transmit modem 1010 to an analog signal and outputs the analog signal to the IF/RF transmitter 1014. The IF/RF transmitter 1014 converts the analog signal output from the D/A converter 1012 to an RF signal and outputs the RF signal.

The interference signal controller 1016 informs the receive modem 1006 of the data to transmit by receiving the transmit data from the transmit modem 1010 and feeding the transmit data back to the receive modem 1006 in consideration of the interference so as to reject the interference caused by the RF signal output via the transmit antenna 1022 in the baseband.

Since the RF signal output via the transmit antenna 1022 acts as the interference signal to the receive antenna 1000, the magnitude converter 1020 receives the RF signal and from a coupler 1023 and changes the magnitude of the RF signal to eliminate the interference signal. Herein, the magnitude converter 1020 receives information for changing the magnitude from the interference signal controller 1016.

The delay converter 1018 delays the RF transmit signal of the magnitude changed at the magnitude converter 1020 and outputs the delayed signal to the RF/IF receiver 1002. Herein, the interference signal controller 1016 provides information for the delay to the delay converter 1018.

As described earlier, the full-duplex RS concurrently performs the transmission and the reception by independently operating the single transmit antenna and the single receive antenna and reusing the entire radio resource. When the entire radio resource is reused using two antennas and the transmission and the reception are conducted at the same time, interference is generated between the transmit antenna and the receive antenna. That is, the signal sent over the transmit antenna is received at the receive antenna to cause the interference. Since such interference is generated between two antennas of the same RS, the RS, which is aware of the transmit signal, can reject the interference from the signal of the receive antenna. The interference can be cancelled in two steps including the RF-stage interference cancellation and the baseband interference cancellation. When the interference cancellation is achieved effectively, the inefficiency in the radio resource consumption of the half-duplex RS can be addressed.

Figure 11:
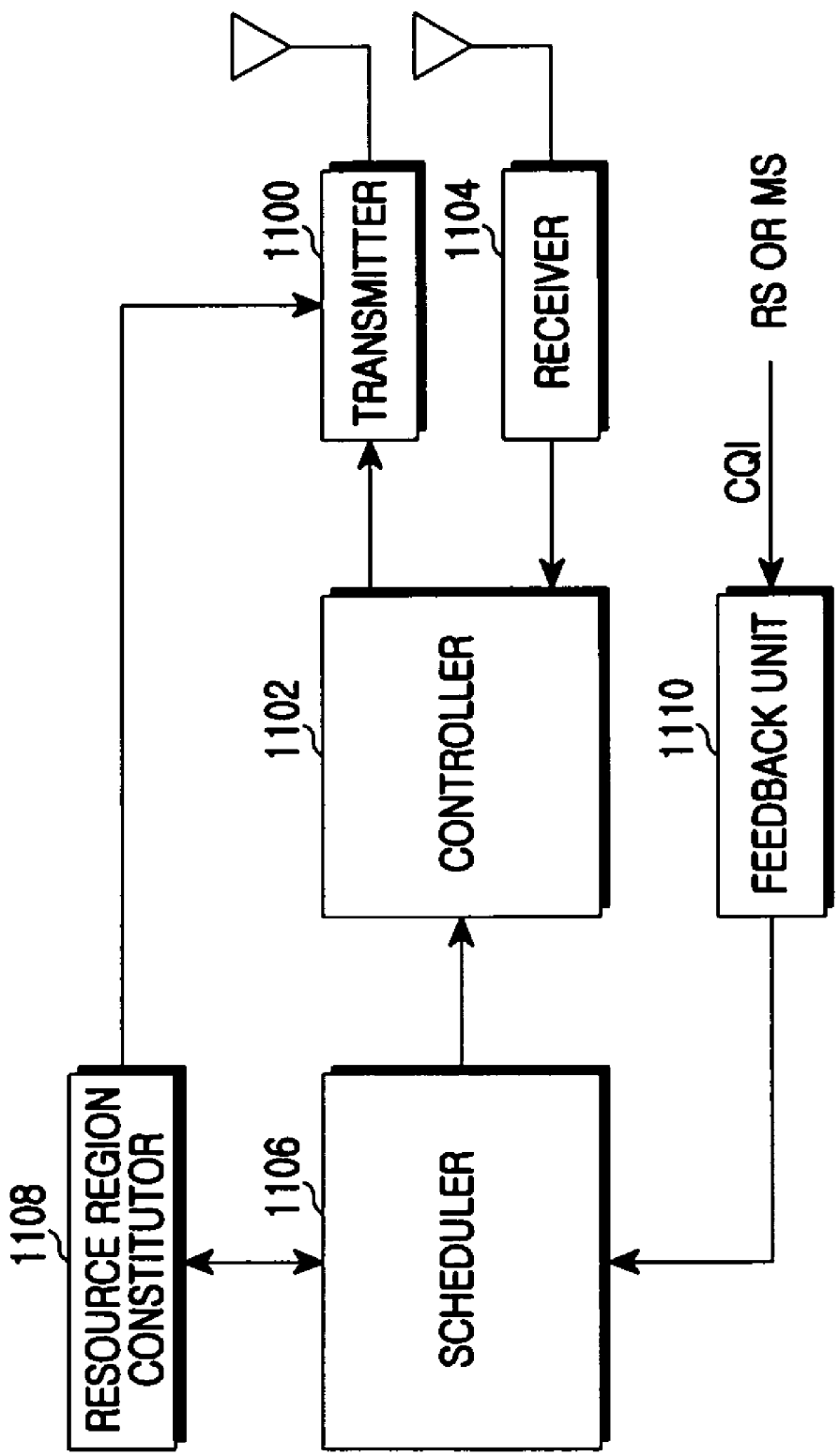
FIG. 11 illustrates the BS apparatus according to an exemplary embodiment of the present invention.

FIG. 11 is a block diagram of the BS apparatus according to an exemplary embodiment of the present invention.

The BS of FIG. 11 includes a controller 1102, a transmitter 1100, a receiver 1104, a feedback unit 1110, a resource region constitutor 1108, and a scheduler 1106.

The feedback unit 1110 receives the CQI information fed back from the MS and the RS and forwards the CQI information to the scheduler 1106. Every MS measures its receive signal strength using the preamble and the pilot signal received from its serving BS and the RS and generates the CQI information. The generated CQI information is fed back to the serving BS using various methods such as Best-M and DCT. In various implementations, the CQI information of the MS can be generated using the uplink sounding method in the TDD based system, rather than the CQI feedback.

In the centralized scheduling using the CQI information of the MSs aggregated from the feedback unit 1110, the scheduler 1106 schedules the MSs in the service coverage, schedules the MSs in the RS service coverage (the primary scheduling), and schedules the RS→MS resource (the secondary scheduling). Should there exits an MS requiring additional allocation after the second resource scheduling, the scheduler 1106 schedules the relay link resource in the second resource region.

In the distributed scheduling, using the CQI information of the MSs aggregated from the feedback unit 1110, the scheduler 1106 determines the resource amount to be allocated to the access links BS ↔MS and BS ↔RS, and allocates the determined BS ↔RS link resource in the preset manner. The scheduler 1106 allocates the determined BS↔MS link resource in the preset manner. Herein, the BS↔RS link resource region or the BS↔MS link resource region is predetermined by separating it on a time basis. For example, the BS↔RS link resource can be allocated from the front part or the rear part of the frame, and the other resource can be allocated as the BS↔MS link resource.

The resource region constitutor 1108 builds the resource region A for the BS→RS resource and the resource region B for the BS→MS resource. In more detail, the resource region constitutor 1108 builds the first resource region for the BS→RS resource scheduled by the scheduler 1106 and builds the second resource region with the other resource region. In so doing, the access link resource and the relay link resource are used at the same time without separating them within the frame. When the resource permutation or hopping patterns of the BS and the RS differ from each other, the resource region constitutor 1108 separates the access link resource region and the relay link resource region on a time basis. The sizes of the access link resource region and the relay link resource region divided on the time basis are determined by the data amounts required by the RSs and the MSs and the channel condition.

The controller 1102, which controls operations of the BS, sends necessary scheduling parameters to the scheduler 1106 or processes the scheduled data through the transmitter 1100 or the receiver 1104. The transmitter 1100 encodes and modulates the data output from the controller 1102 and transmits the data via the antenna over the radio channel. The receiver 1104 demodulates and decodes data received via the antenna and provides the received data to the controller 1102.

As set forth above, by means of the method and the apparatus for the efficient resource allocation in a wireless communication system based on the full-duplex RS and the frame structures for the interference mitigation in the resource allocation, the wireless communication system based on the full-duplex RS can be operated with efficiency, the interference with the BS coverage can be mitigated, and the resource allocation of the RS coverage can be flexibly accomplished. In addition, the relay link resource is reused in the full-duplex relay structure, and the system capacity can be raised by minimizing the interference in the resource utilization.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for a centralized resource allocation in a wireless communication system based on a full-duplex relay, the method comprising:
   receiving channel information from a plurality of mobile stations (MSs) and relay stations (RSs);
   scheduling radio resources for a link between a base station (BS) and a mobile station and a link between the base station and a relay station using the channel information;
   configuring a first radio resource region for the link between the base station and the relay station and a second radio resource region for the link between the base station and the mobile station; and
   scheduling a radio resource of each RS for a link between the relay station and the mobile station by reusing the first radio resource region based on the full-duplex relay,
   wherein the full-duplex relay is performed using two antennas based on a same radio resource, a first of the two antennas configured for communication between the base station and the relay station and the second of the two antennas configured for communication between the relay station and the mobile station,
   wherein in the full-duplex relay, the relay station receives data in an access link and transmits data in a relay link at the same time by reusing the first radio resource region, or the relay station transmits data in an access link and receives data in a relay link at the same time by reusing the first radio resource region,
   wherein the access link comprises a link between the MS and the RS or a link between the MS and the BS, and the relay link comprises a link between the RS and the BS or a link between the RS and the MS.

2. The method of claim 1, further comprising:
   after scheduling the radio resource for the link between the relay station and the mobile station, when additional resource allocation is needed for the link between the relay station and the mobile station, allocating a resource using the second radio resource region.

3. The method of claim 1, wherein when resource permutation or hopping patterns of the base station and the relay station are the same, the radio resources between the base station and the relay station are scheduled in a distributed manner to build the first radio resource region.

4. The method of claim 1, wherein when resource permutation or hopping patterns of the base station and the relay station are different from each other, the radio resources between the base station and the relay station are scheduled in a time region of a preset frame to build the first radio resource region.

5. The method of claim 4, wherein the radio resource region between the base station and the relay station and the radio resource region between the base station and the mobile station are separated based on the time region in the frame, and a size of the radio resource region between the base station and the relay station is determined by data amounts required by the relay stations and the mobile stations and channel condition.

6. The method of claim 1, wherein a frame is transmitted to and received from the BS over a first antenna, and
   wherein the frame is transmitted to and received from a mobile station (MS) and a lower relay station (RS) over a second antenna.

7. The method of claim 6, wherein interference between the first antenna and the second antenna is canceled at a receiving side.

8. The method of claim 6, wherein a frame for a relay link and a frame for an access link coexist in the frame structure, a preamble for the relay station in a base station frame is unnecessary, frame related information and broadcast information (FCH) for the mobile station and the relay station are simultaneously transmitted in the base station frame, and MAP information for the mobile station and relay station are transmitted in succession in the base station frame.

9. The method of claim 1, wherein a frame is received over a first antenna and transmitted over a second antenna, or the frame is transmitted over the first antenna and received over the second antenna.

10. The method of claim 9, wherein interference between the first antenna and the second antenna is canceled at a receiving side.

11. The method of claim 9, wherein a frame for a relay link and a frame for an access link coexist in the frame structure, a preamble for the relay station in a base station frame is unnecessary, frame related infoimation and broadcast information (FCH) for the mobile station and the relay station are simultaneously transmitted in the base station frame, and MAP information for the mobile station and relay station are transmitted in succession in the base station frame.

12. A method of operating a base station (BS) for a distributed resource allocation in a wireless communication system based on a full-duplex relay, the method comprising:
receiving channel information from a plurality of mobile stations (MSs);
determining radio resource amounts for a link between the base station and a mobile station and a link between the base station and a relay station (RS) using the channel information received from the mobile stations;
allocating a radio resource for the link between the base station and the relay station in a corresponding region of a frame according to the determined resource amount; and
allocating radio resources of the relay station for the link between the relay station and the mobile station by reusing the radio resource region for the link between the base station and the relay station based on the full-duplex relay,
wherein the full-duplex relay is performed using two antennas based on a same radio resource, a first of the two antennas configured for communication between the base station and the relay station and the second of the two antennas configured for communication between the relay station and the mobile station,
wherein in the full-duplex relay, the relay station receives data in an access link and transmits data in a relay link at the same time by reusing the first radio resource region, or the relay station transmits data in an access link and receives data in a relay link at the same time by reusing the first radio resource region,
wherein the access link comprises a link between the MS and the RS or a link between the MS and the BS, and the relay link comprises a link between the RS and the BS or a link between the RS and the MS.

13. The method of claim 12, wherein a radio resource region for the link between the base station and the mobile station and a radio resource region for the link between the base station and the relay station are predetermined by separating based on time regions.

14. The method of claim 13, wherein the radio resources for the link between the base station and the relay station are allocated from a front part or a rear part of the frame to a certain time region, and other radio region is allocated as radio resources for the link between the base station and the mobile station.

15. A method of operating a relay station (RS) for a distributed resource allocation in a wireless communication system based on a full-duplex relay, the method comprising:
receiving channel information from a plurality of mobile stations (MSs); and
allocating radio resources between the relay station and a mobile station in a preset resource region using the channel information, wherein the radio resources between the relay station and the mobile station reuse radio resources between the base station and the mobile station, based on the full-duplex relay,
wherein the full-duplex relay is performed using two antennas based on a same radio resource, a first of the two antennas configured for communication between a base station and the relay station and the second of the two antennas configured for communication between the relay station and the mobile station,
wherein in the full-duplex relay, the relay station receives data in an access link and transmits data in a relay link at the same time by reusing the first radio resource region, or the relay station transmits data in an access link and receives data in a relay link at the same time by reusing the first radio resource region,
wherein the access link comprises a link between the MS and the RS or a link between the MS and the BS, and the relay link comprises a link between the RS and the BS or a link between the RS and the MS.

16. An apparatus for a distributed resource allocation in a wireless communication system based on a full-duplex relay, the apparatus comprising:
a feedback unit configured to receive channel information from a plurality of mobile stations (MSs) and relay stations (RSs);
a scheduler configured to schedule radio resources for a link between a base station (BS) and a mobile station and a link between the base station and a relay station using the channel quality, and schedule radio resources of each RS for a link between the relay station and the mobile station by reusing the radio resources for the link between the base station and the relay station based on full-duplex relay; and
a resource region constitutor configured to generate a first radio resource region for the link between the base station and the relay station and a second radio resource region for the link between the base station and the mobile station,
wherein the full-duplex relay is performed using two antennas based on a same radio resource, a first of the two antennas configured for communication between the base station and the relay station and the second of the two antennas configured for communication between the relay station and the mobile station,
wherein in the full-duplex relay, the relay station receives data in an access link and transmits data in a relay link at the same time by reusing the first radio resource region, or the relay station transmits data in an access link and receives data in a relay link at the same time by reusing the first radio resource region,
wherein the access link comprises a link between the MS and the RS or a link between the MS and the BS, and the relay link comprises a link between the RS and the BS or a link between the RS and the MS.

17. The apparatus of claim 16, wherein the scheduler, when additional resource allocation is needed for the link between the relay station and the mobile station after scheduling the radio resources for the link between the relay station and the mobile station, is configured to allocate resources using the second radio resource region.

18. The apparatus of claim 16, wherein when resource permutation or hopping patterns of the base station and the relay station are the same, the radio resources between the base station and the relay station are scheduled in a distributed manner to build the first radio resource region.

19. The apparatus of claim 16, wherein when resource permutation or hopping patterns of the base station and the relay station are different from each other, the radio resources between the base station and the relay station are scheduled in a time region of a preset frame to build the first radio resource region.

20. The apparatus of claim 19, wherein the radio resource region between the base station and the relay station and the radio resource region between the base station and the mobile station are separated based on the time region in the frame, and a size of the radio resource region between the base station and the relay station is determined by data amounts required by the relay stations and the mobile stations and channel condition.

21. An apparatus of a base station (BS) for a distributed resource allocation in a wireless communication system based on a full-duplex relay, the apparatus comprising:
   a feedback part configured to receive channel information from a plurality of mobile stations (MSs);
   a controller configured to determine radio resource amounts for a link between the base station and a mobile station and a link between the base station and a relay station (RS) using the channel information received from the mobile stations; and
   a scheduler configured to allocate a radio resource for the link between the base station and the relay station in a corresponding region of a frame according to the determined resource amount, the scheduler configured to allocate a radio resource of the relay station for the link between the relay station and the mobile station by reusing the radio resource region for the link between the base station and the relay station based on the full-duplex relay,
   wherein the full-duplex relay is performned using two antennas based on a same radio resource, a first of the two antennas configured for communication between the base station and the relay station and the second of the two antennas configured for communication between the relay station and the mobile station,
   wherein in the full-duplex relay, the relay station receives data in an access link and transmits data in a relay link at the same time by reusing the first radio resource region, or the relay station transmits data in an access link and receives data in a relay link at the same time by reusing the first radio resource region,
   wherein the access link comprises a link between the MS and the RS or a link between the MS and the BS, and the relay link comprises a link between the RS and the BS or a link between the RS and the MS.

22. The apparatus of claim 21, wherein a radio resource region for the link between the base station and the mobile station and a radio resource region for the link between the base station and the relay station are predetermined by separating based on time regions.

23. The apparatus of claim 22, wherein radio resources for the link between the base station and the relay station are allocated from a front part or a rear part of the frame to a certain time region, and other radio region is allocated as radio resources for the link between the base station and the mobile station.

24. An apparatus of a relay station (RS) for a distributed resource allocation in a wireless communication system based on a full-duplex relay, the apparatus comprising:
   a receive modem configured to receive channel information from a plurality of mobile stations (MSs); and
   a data buffer configured to allocate radio resources between the relay station and a mobile station in a preset resource region using the channel information, wherein the radio resources between the relay station and the mobile station reuse radio resources between the base station and the mobile station based on the full-duplex relay,
   wherein the full-duplex relay is performed using two antennas based on a same radio resource, a first of the two antennas configured for communication between a base station and the relay station and the second of the two antennas configured for communication between the relay station and the mobile station,
   wherein in the full-duplex relay, the relay station receives data in an access link and transmits data in a relay link at the same time by reusing the first radio resource region, or the relay station transmits data in an access link and receives data in a relay link at the same time by reusing the first radio resource region,
   wherein the access link comprises a link between the MS and the RS or a link between the MS and the BS, and the relay link comprises a link between the RS and the BS or a link between the RS and the MS.

* * * * *